United States Patent
Lew

(10) Patent No.: US 11,252,152 B2
(45) Date of Patent: *Feb. 15, 2022

(54) VOICEPRINT SECURITY WITH MESSAGING SERVICES

(71) Applicant: salesforce.com, inc., San Francisco, CA (US)

(72) Inventor: Eugene Lew, Olney, MD (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/892,024

(22) Filed: Jun. 3, 2020

(65) Prior Publication Data

US 2020/0296098 A1    Sep. 17, 2020

Related U.S. Application Data

(63) Continuation of application No. 15/885,585, filed on Jan. 31, 2018, now Pat. No. 10,715,522.

(51) Int. Cl.
*H04L 29/06* (2006.01)
*G10L 17/24* (2013.01)
(Continued)

(52) U.S. Cl.
CPC .......... *H04L 63/0861* (2013.01); *G06F 21/32* (2013.01); *G10L 17/00* (2013.01);
(Continued)

(58) Field of Classification Search
CPC . H04L 63/0861; H04L 65/1069; H04L 63/10; G06F 21/32; G10L 17/00; G10L 17/04; G10L 17/14; G10L 17/24
See application file for complete search history.

(56) References Cited

U.S. PATENT DOCUMENTS

| | | | |
|---|---|---|---|
| 6,519,561 B1* | 2/2003 | Farrell | G10L 15/07 704/232 |
| 8,645,137 B2* | 2/2014 | Bellegarda | G10L 15/07 704/250 |

(Continued)

OTHER PUBLICATIONS

United States Office Action, U.S. Appl. No. 15/885,585, filed Dec. 20, 2019, ten pages.

*Primary Examiner* — Trang T Doan
(74) *Attorney, Agent, or Firm* — Fenwick & West LLP

(57) ABSTRACT

An online system authenticates a user through a voiceprint biometric verification process. When a user needs to be authenticated, the online system generates and provides a random phrase to the user. The online system receives an audio recording of the randomly generated phrase and retrieves a previously trained voiceprint model for the user. The online system analyzes the audio recording by applying the voiceprint model to determine whether the audio recording satisfies a first criteria of whether the voice in the audio recording belongs the user and a second criteria of whether the audio recording includes a vocalization of the randomly generated phrase. If the audio recording satisfies both criteria, the online system authenticates the user. Therefore, the user can be provided access to a new communication session in response to being authenticated.

20 Claims, 6 Drawing Sheets

(51) Int. Cl.
*G10L 17/04* (2013.01)
*G10L 17/14* (2013.01)
*G06F 21/32* (2013.01)
*G10L 17/00* (2013.01)

(52) U.S. Cl.
CPC .............. *G10L 17/04* (2013.01); *G10L 17/14* (2013.01); *G10L 17/24* (2013.01); *H04L 65/1069* (2013.01); *H04L 63/10* (2013.01)

(56) References Cited

U.S. PATENT DOCUMENTS

| | | | |
|---|---|---|---|
| 9,262,612 B2 ‡ | 2/2016 | Cheyer | G06F 21/32 |
| 10,079,022 B2 * | 9/2018 | Kim | G10L 15/183 |
| 10,621,317 B1 * | 4/2020 | Sardari | G06F 21/44 |
| 2003/0009333 A1 * | 1/2003 | Sharma | G10L 15/04 |
| | | | 704/246 |
| 2003/0046072 A1 * | 3/2003 | Ramaswamy | G06F 40/56 |
| | | | 704/240 |
| 2012/0084078 A1 ‡ | 4/2012 | Moganti | G06F 21/32 |
| | | | 704/201 |
| 2012/0130714 A1 * | 5/2012 | Zeljkovic | G10L 17/04 |
| | | | 704/235 |
| 2013/0132091 A1 * | 5/2013 | Skerpac | G06F 21/32 |
| | | | 704/273 |
| 2014/0379354 A1 * | 12/2014 | Zhang | G06Q 20/40145 |
| | | | 704/275 |
| 2016/0019915 A1 * | 1/2016 | Khan | G10L 19/018 |
| | | | 704/239 |
| 2017/0270930 A1 * | 9/2017 | Ozmeral | G10L 17/00 |
| 2017/0318013 A1 * | 11/2017 | Roy | G06F 21/36 |
| 2018/0040325 A1 * | 2/2018 | Melanson | G10L 17/00 |
| 2018/0089407 A1 * | 3/2018 | Watson | G10L 17/24 |
| 2018/0205726 A1 ‡ | 7/2018 | Chari | H04L 63/0861 |
| 2019/0372970 A1 * | 12/2019 | Yan | H04L 63/18 |

* cited by examiner
‡ imported from a related application

| Training Example | Training Audio Recording 205 | Random Phrase 210 | Label 215 |
|---|---|---|---|
| 1 |  | "Cow jumped over the moon" | 1 |
| 2 |  | "The sky is blue" | 1 |
| 3 |  | "Cat in the hat" | 0 |

. . .

VOICEPRINT SECURITY WITH MESSAGING SERVICES

CROSS REFERENCE TO RELATED APPLICATIONS

This application is a continuation of co-pending U.S. application Ser. No. 15/885,585 filed Jan. 31, 2018, which is herein incorporated in its entirety by reference.

BACKGROUND

This disclosure generally relates to security in computing systems, and more specifically to authenticating users through audio voiceprints.

Conventional methods for authenticating users in computing systems include the use of login credentials such as passwords, pin codes, secure tokens and encrypted keys. However, conventional methods can be easily hacked and compromised and therefore, are often not sufficient for the purposes of authenticating user's identity. To increase user security, many conventional systems have employed multi-factor validations that require more than one form of authentication. However, multi-factor validations can still be ineffective. For example, if a user's phone is compromised, multiple authentication methods (e.g., user email, user texts) can be compromised simultaneously. Furthermore, the multi-step authentication process is highly cumbersome for a user that is required to provide more than one form of authentication. This is particularly problematic in scenarios involving messaging services where conversations can be brief. In other words, users must dedicate significant effort to overcome multiple authentication processes in order to undertake a simple activity such as a conversation.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
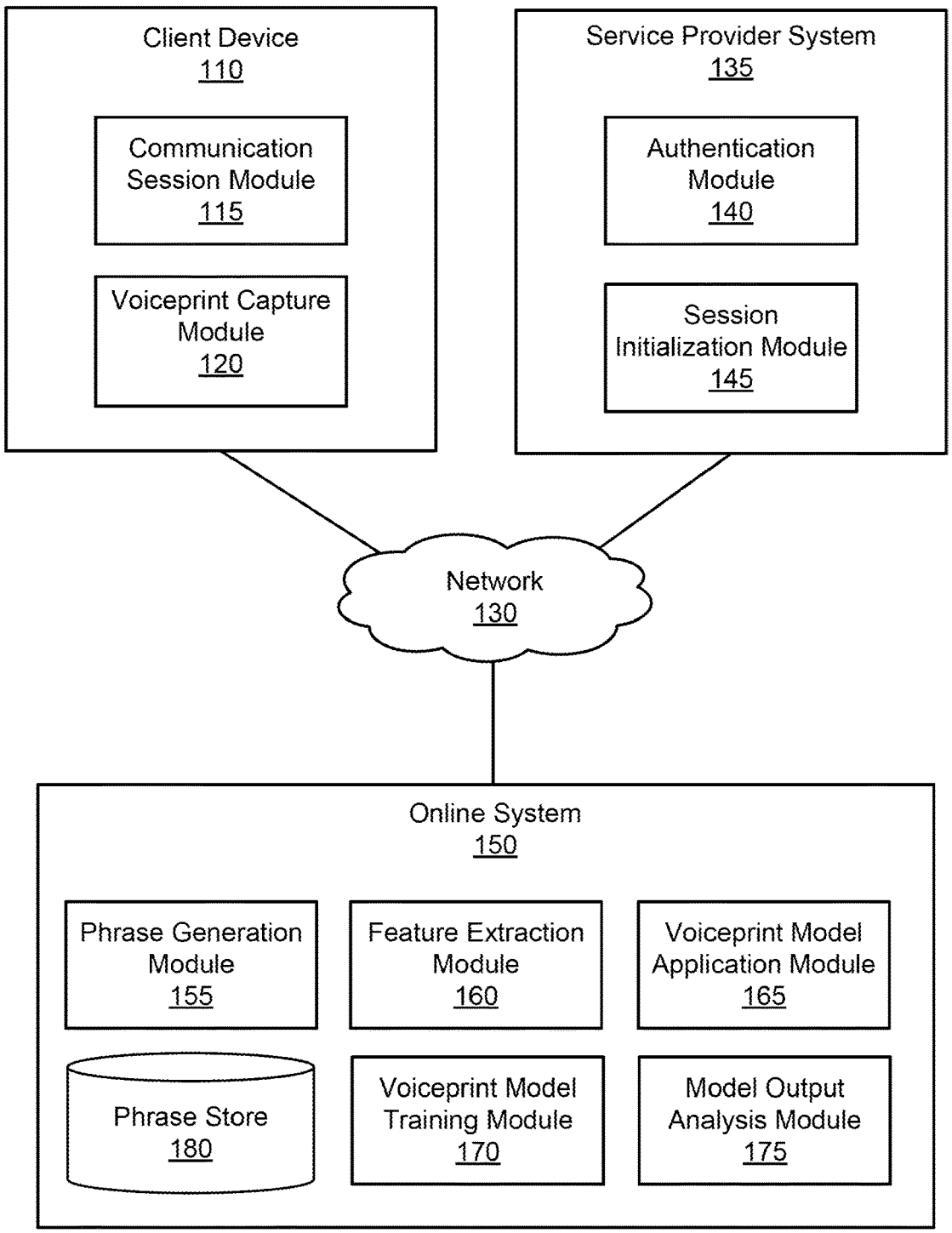
FIG. 1 depicts an overall system environment for authenticating a communication session through a voiceprint, in accordance with an embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

An online system collaborates with a service provider system to authenticate a user for a new communication session by verifying a voiceprint recording provided by the user. By using voiceprint biometric technology to authenticate a user, the online system is able to authenticate users with higher confidence in comparison to conventional methods. Furthermore, the implementation of the voiceprint biometric technology enables a less cumbersome authentication experience for the user. For example, the user can more seamlessly vocalize a phrase as opposed to entering in one or multiple passwords, pin codes, tokens, and the like.

A user of a client device sends a request to the service provider system to initialize a new communication session. The service provider system works with the online system to provide a randomly generated phrase for the user of the client device. Here, the randomly generated phrase is different from any prior phrase that has been presented to the user. By ensuring that the phrase is different for each new communication session, the online system can prevent a hacker from gaining unauthorized access.

In an embodiment, the user of the client device generates an audio recording of the user vocalizing the randomly generated phrase and provides the audio recording to the service provider system. The service provider system forwards the audio recording to the online system for authentication. The online system analyzes the audio recording to determine 1) whether the voice in the audio recording belongs to the user and 2) whether the phrase vocalized in the audio recording matches the randomly generated phrase. If the online system determines that the audio recording satisfies both criteria, the online system instructs the service provider system to provide the user of the client device with access to a new communication session. Altogether, in comparison to conventional methods (e.g., passwords and pin codes), the implementation of a user-specific voiceprint enables the online system to authenticate a user with higher confidence and fidelity.

To authenticate users, the online system trains and applies voiceprint models that are each generated for a specific user. Each voiceprint model is trained to identify whether a voice in an audio recording belongs to a particular user and to predict a phrase that is spoken in the audio recording. When the online system receives an audio recording from a user of a client device, the online system extracts voice pattern features from the audio recording and applies the voice pattern features as input to a voiceprint model of the user. The voiceprint model outputs an authentication score that represents a similarity between the voice in the audio recording and the user's voice in prior audio recordings. The online system determines that the voice in the audio recording belongs to the user based on the authentication score. Furthermore, the voiceprint model outputs a prediction of a phrase spoken in the audio recording. The online system verifies that the predicted phrase is the randomly generated phrase previously presented to the client device. The online system transmits an indication to the service provider system that the user of the client device is authenticated and therefore, the service provider system can provide the user with access to a new communication session.

Overall System Environment

FIG. 1 depicts an overall system environment 100 for authenticating a communication session through a voiceprint, in accordance with an embodiment. In various embodiments, the overall system environment 100 includes a client device 110, a service provider system 135, and an online system 150. Although FIG. 1 depicts one client device 110 and one service provider system 135, in various embodiments, there may be additional or fewer client devices 110 and/or additional or fewer service provider systems 135 that each interact with the online system 150 through the network 130.

In various embodiments, the service provider system 135 and the online system 150 can be embodied as a single system in the overall system environment 100. For example, the service provider system 135 may operate as a sub-system of the online system 150 and therefore, the operations described hereafter that are performed by the service provider system 135 can instead be performed by the online system 150.

Network

In various embodiments, the network 130 facilitates communications between the client device 110, the service provider system 135, and the online system 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Client Device

A client device 110 is operated by a user and provides requests to the service provider system 135 to access a communication session operated by the service provider system 135. Generally, a client device 110 sends a request to the service provider system 135 for a communication session, and subsequently provides authentication information, such as an audio recording generated by the client device 110, such that the service provider system 135 can verify the identity of the user of the client device 110 based on the authentication information.

In various embodiments, the client device 110 provides multiple authentication information to satisfy multiple levels of authentication. Therefore, the service provider system 135 can verify, with higher levels of confidence, the identity of the user of client device 110 by using the multiple authentication information. As an example, the client device 110 can provide login credentials (e.g., a user name and pre-designated password) to the service provider system 135 to satisfy a first level of authentication. Additionally, the client device 110 can provide the audio recording to the service provider system 135 to satisfy a second level of authentication.

In various embodiments, a client device 110 can be embodied as an electronic device. For example, the client device 110 can be a personal computer (PC), a desktop computer, a laptop computer, a notebook, a tablet PC executing an operating system, for example, a Microsoft Windows-compatible operating system (OS), Apple OS X, and/or a Linux distribution. In various embodiments, the client device 110 includes installed software applications that are executed by a processor of the client device 110 that enable the client device 110 to interact with the service provider system 135 and/or the online system 150. For example, a software application installed on the client device 110 can be an application developed by the service provider system 135. Therefore, the client device 110 can interact with the service provider system 135 through a software application developed by the service provider system 135 and executed by a processor of the client device 110.

As shown in FIG. 1, the client device 110 includes a communication session module 115 and a voiceprint capture module 120. The communication session module 115 sends a request to the service provider system 135 for a communication session. A communication session can be one of a phone call, an online chat, a voice call, a video call, a text conversation, an email, or any other form of communication. The communication session module 115 may send a request to the service provider system 135 that specifies the type of communication session that is requested. In some embodiments, the communication session module 115 sends a request to the service provider system 135 for a communication session that does not yet exist. In other words, the communication session module 115 sends a request each time a communication session is to be newly initialized by the service provider system 135. In other embodiments, the communication session module 115 sends a request to the service provider system 135 to access an already existing communication session. For example, the client device 110 may have previously accessed a chat room hosted by the service provider system 135, but then inadvertently left the chat room. Here, the communication session module 115 can send a request to the service provider system 135 to re-access the chat room.

In various embodiments, the communication session module 115 sends a request that includes an identifier such that the service provider system 135 can identify who the request originated from. In one embodiment, the communication session module 115 sends a request that includes a device identifier that uniquely identifies the client device 110. In one embodiment, the communication session module 115 sends a request that identifies a user of the client device 110. For example, the request can include a user identifier (e.g., a user name) associated with the user of the client device 110. Such a user identifier may be previously assigned to the user of the client device 110, for example, when the user first registers and interacts with the service provider system 135.

At a subsequent time, the communication session module 115 accesses the communication session after the service provider system 135 determines that the user of the client device 110 is authenticated and is authorized to access the communication session. Depending on the type of communication session (e.g., online chat, phone call, text conversation), a user of the client device 110 can access and provide communications via the communication session.

The voiceprint capture module 120 generates an audio recording of a random phrase. In various embodiments, the voiceprint capture module 120 receives the random phrase from the service provider system 135 as a form of authentication. Generally, the random phrase is different from any phrase that has been previously provided to the client device. The voiceprint capture module 120 generates an audio recording of a user speaking the random phrase and provides the audio recording to the server provider system 135 for authentication.

In various embodiments, the voiceprint capture module 120 communicates with various hardware devices of the client device 110 to generate the audio recording. In one embodiment, the voiceprint capture module 120 displays the random phrase received from the service provider system 135 on a display of the client device 110. Therefore, a user of the client device 110 can read the random phrase and vocalize the random phrase. In one embodiment, the voiceprint capture module 120 operates a recording device of the client device 110, such as a microphone. For example, the voiceprint capture module 120 can initialize the recording device to capture an audio recording of the user who vocalizes the random phrase. The voiceprint capture module 120 transmits the captured audio recording to the service provider system 135 for authentication.

Service Provider System

The service provider system 135 communicates with the client device 110 and online system 150 to provide a user of the client device 110 access to a communication session based on an audio recording provided by the client device 110. In various embodiments, the service provider system 135 can be associated with an entity that holds sensitive information such as a bank, a consulting firm, a hospital, government agency, and the like. Therefore, before communicating with a user of a client device 110 through a communication session, the service provider system 135 seeks to verify the identity of the user of the client device 110.

The service provider system 135 receives a request from the client device 110 to initialize a communication session. After receiving the request, the service provider system 135 can send a query to the client device 110 for authentication information, examples of which include login credentials of the user of the client device 110 or an audio recording of a random phrase. In one scenario, after receiving the request, the service provider system 135 interacts with the online system 150 to obtain a randomly generated phrase that is provided to the client device 110. Once the service provider system 135 receives the authentication information, the service provider system 135 can perform the authentication process or, in some embodiments, provide the authentication information to the online system 150. Once the user is authenticated based on the authentication information, the service provider system 135 can provide the client device 110 access to the communication session.

As shown in FIG. 1, the service provider system 135 includes an authentication module 140 and a session initialization module 145. In one embodiment, the authentication module 140 receives the authentication information from the client device 110 and performs an authentication process using the authentication information. As an example of the authentication process, the authentication module 140 may compare the authentication information received from the client device 110 to previously obtained information stored by the service provider system 135. For example, the authentication module 140 may receive login credentials that include a user name and a corresponding password from the client device 110. Therefore, the authentication module 140 can compare the login credentials to a stored database of login credentials. In various embodiments, the database of login credentials includes key-value pairs that links user names to passwords.

In some embodiments, the authentication module 140 receives and provides the authentication information to the online system 150 such that the online system 150 can perform the authentication process. As an example, the authentication module 140 may receive an audio recording captured by the client device 110. Thus, the authentication module 140 provides the audio recording captured by the client device 110 to the online system 150 for authentication. In some embodiments, the authentication module 140 further provides an identifier along with the authentication information to the online system 150. In one embodiment, the authentication module 140 provides a device identifier that identifies the client device 110 that provided the authentication information. In one embodiment, the authentication module 140 provides a user identifier that identifies the user of the client device 110 that provided the authentication information.

In some embodiments, the authentication module 140 performs an authentication process on a first set of authentication information while additionally transmitting a second set of authentication information to the online system 150 for authentication. As an example, a first set of authentication information may be login credentials (e.g., user name and password) that correspond to a first level of authentication of the service provider system 135. Additionally, the second set of authentication information may be an audio recording captured by the client device 110 that the service provider system 135 provides to the online system 150 for authentication. Thus, in these embodiments, the service provider system 135 and the online system 150 can work together to establish multiple levels of authentication that are to be satisfied prior to providing the user of the client device 110 access to a communication session.

The session initialization module 145 initializes a communication session for a user of a client device 110. In one embodiment, the session initialization module 145 initializes a communication session in response to receiving a request for a communication session from the client device 110. However, the session initialization module 145 may not provide the client device 110 access to the communication session until the user of the client device 110 has been authenticated. In these embodiments, the session initialization module 145 can initialize a communication session in parallel to the authentication process performed by the authentication module 140 and/or the online system 150. In various embodiments, the session initialization module 145 initializes a communication session in response to a successful authentication of the user of the client device 110. Thus, the session initialization module 145 need not prematurely initialize a communication session given that the user of the client device 110 can possibly fail the authentication process. If the authentication process yields a successful authentication, the session initialization module 145 can provide both the communication session and access to the communication session to the client device 110 together.

Online System

The online system 150 authenticates a user of the client device 110 by analyzing an audio recording generated by the client device 110, where the audio recording includes the vocalization of a random phrase previously generated by the online system 150 for the user. In various embodiments, the online system 150 generates a voiceprint model for each user based on a variety of different training audio recordings obtained from the user. Therefore, to perform the authentication process on an audio recording from a user of a client device 110, the online system 150 retrieves and applies the voiceprint model for the user to analyze the audio recording in view of prior, training audio recordings obtained from the user. Based on the analysis, the online system 150 determines whether the user of the client device 110 is authenticated and if so, can provide an indication to the service provider system 135 to provide access to the communication session. To perform these aforementioned functions, the online system 150 employs a phrase generation module 155, a feature extraction module 160, a voiceprint model application module 165, a voiceprint model training module 170, a model output analysis module 175, and a phrase store 180.

The phrase generation module 155 randomly generates a phrase for a new communication session that is to be provided to a user of a client device 110. In one embodiment, the phrase generation module 155 randomly generates a phrase for a new communication session in response to a request from the service provider system 135. The phrase generation module 155 can provide the randomly generated phrase to the service provider system 135 such that a user of the client device 110 can provide an audio recording of a vocalization of the phrase.

In one embodiment, the randomly generated phrase is a string of random words. For example, a randomly generated phrase can be "axle jumping moon hyphen beans." Here, the phrase generation module 155 can access random words from a database and construct the randomly generated phrase. In other embodiments, the randomly generated phrase is a grammatically correct sentence. For example, a randomly generated phrase that is grammatically correct can be "It is sunny out today." Here, for each word in the randomly generated phrase, the phrase generation module 155 can randomly select a word with an appropriate word type such that the syntax of the phrase is grammatically correct. Examples of word types can be a noun, verb, adjective, adverb, participles and the like.

In various embodiments, the phrase generation module 155 randomly generates a phrase in view of prior phrases that have been generated for the user of the client device 110. Specifically, the phrase generation module 155 generates a phrase and performs a check to ensure that the randomly generated phrase is different from all prior phrases that have been generated for the user of the client device 110. In one embodiment, the phrase generation module 155 performs a check by accessing the phrase store 180 which can be a database that stores phrases that have been provided for a particular user. As one example, the phrase store 180 is a table that includes a user identifier that identifies a user of a client device 110 as well as one or more phrases that have previously been provided for the user.

The phrase generation module 155 compares the randomly generated phrase to prior phrases that were generated for the user. If the randomly generated phrase is substantially similar to a phrase that was previously generated for the user, the phrase generation module 155 regenerates a new randomly generated phrase. In one embodiment, the phrase generation module 155 deems two phrases as substantially similar if the two phrases share a threshold number of matching words. In some embodiments, the phrase generation module 155 deems two phrases as substantially similar if the two phrases share a threshold number of matching phonemes.

The phrase generation module 155 provides the randomly generated phrase to the service provider system 135 such that a user of the client device 110 that requested for the new communication session can be presented with the randomly generated phrase. In various embodiments, the phrase generation module 155 updates the phrase store 180 to reflect that the randomly generated phrase has been provided to the service provider system 135. For example, if the phrase store 180 is a database that includes user identifiers that each identify a user, the phrase generation module 155 associates the randomly generated phrase with the user identifier that identifies the user of the client device that requested for the new communication session.

The feature extraction module 160 receives an audio recording and extracts voice pattern features from the audio recording. In one embodiment, the audio recording is a training audio recording obtained by a client device 110 that is to be used for training a voiceprint model. In another embodiment, the audio recording is obtained by a client device 110 for real-time verification of a user of a client device 110 whose voice is in the audio recording.

Generally, voice pattern features extracted by the feature extraction module 160 represent characteristics of the audio recording. In various embodiments, voice pattern features of an audio recording can be used to distinguish a voice of one user from the voice of other users. In some embodiments, voice pattern features of an audio recording can be used to determine whether a particular phrase is vocalized in the audio recording. In various embodiments, the feature extraction module 160 extracts a first set of voice pattern features that can be used to distinguish a voice of one user from the voice of other users and a second set of voice pattern features that can be used to determine whether a particular phrase is vocalized in the audio recording.

Examples of voice pattern features in the first set include statistical measures of the amplitude of the audio recording (e.g., maximum, minimum, average, median amplitude), statistical measures of the frequency of the voice in the audio recording (maximum, minimum, average, median mode frequency), a cadence of a voice, lengths of time for particular sounds, and other identifying features (e.g., an accent or a lisp). Examples of voice pattern features in the second set include a categorization of a phoneme (e.g., stop, fricative, approximant, vowel), Mel-frequency cepstral coefficients, perceptual linear predictive coefficients, filter-bank features. In some embodiments, overlapping voice pattern features can be in both the first set and the second set of voice pattern features. In other words, certain voice pattern features that can be informative for distinguishing a voice of a user can also be informative for determining a vocalized phrase in the audio recording, and vice versa.

The feature extraction module 160 provides the voice pattern features extracted from the audio recording to the voiceprint model application module 165 or to the voiceprint model training module 170. The voiceprint model training module 170 trains a voiceprint model that is specific for a user, such as a user that provided one or more training audio recordings. The training process performed by the voiceprint model training module 170 is described in further detail below in relation to FIG. 2B. The voiceprint model training module 170 stores the trained voiceprint model for later retrieval by the voiceprint model application module 165. In one embodiment, the voiceprint model training module 170 stores the trained voiceprint model in association with an identifier, such as a user identifier or device identifier, that identifies the user or client device that provided the training audio recordings.

The voiceprint model application module 165 retrieves the previously trained voiceprint model that is specific for the user of the client device 110 that obtained the audio recording. The voiceprint model applies the voice pattern features as input to the voiceprint model, which outputs an authentication score and a predicted phrase. The authentication score represents a similarity between the voice in the audio recording and prior audio recordings of the user that were used to train the voiceprint model. The predicted phrase represents a prediction of the vocalized phrase in the recording. The processes performed by the voiceprint model application module 165 is described in further detail below in relation to FIG. 2A.

The model output analysis module 175 analyzes the output from a voiceprint model to determine whether to provide the user of the client device 110 access to a new communication session. In various embodiments, the model output analysis module 175 separately analyzes the authentication score and the predicted phrase. The model output analysis module 175 authenticates the user of the client device 110 if both analyses are satisfactory.

Referring to the analysis of the authentication score, the model output analysis module 175 compares the authentication score to a threshold score. In one embodiment, if the authentication score is greater than the threshold score, the model output analysis module 175 deems that the voice of the audio recording is the user of the client device 110.

Referring to the analysis of the predicted phrase, the model output analysis module 175 compares the predicted phrase to the predicted phrase that was randomly generated by the phrase generation module 155. In one embodiment, the model output analysis module 175 performs a word-by-word comparison between the predicted phrase and the randomly generated phrase. Based on the comparison, the model output analysis module 175 determines whether the predicted phrase satisfies the randomly generated phrase. In one embodiment, the model output analysis module 175 deems the predicted phrase a satisfactory match to the randomly generated phrase if a threshold number of words are matching between the two phrases. In one embodiment, the model output analysis module 175 deems the predicted phrase a satisfactory match to the randomly generated phrase if a threshold number of phonemes are matching between the two phrases. In some embodiments, the model output analysis module 175 deems the predicted phrase a satisfactory match to the randomly generated phrase if all phonemes or all words in the two phrases match.

If the model output analysis module 175 determines that both analyses are satisfactory, the model output analysis module 175 provides an authorization to the service provider system 135 that indicates that the user of the client device 110 is to be provided access to a new communication session.

Authenticating an Audio Recording Using a Voiceprint Model

Figure 2A:
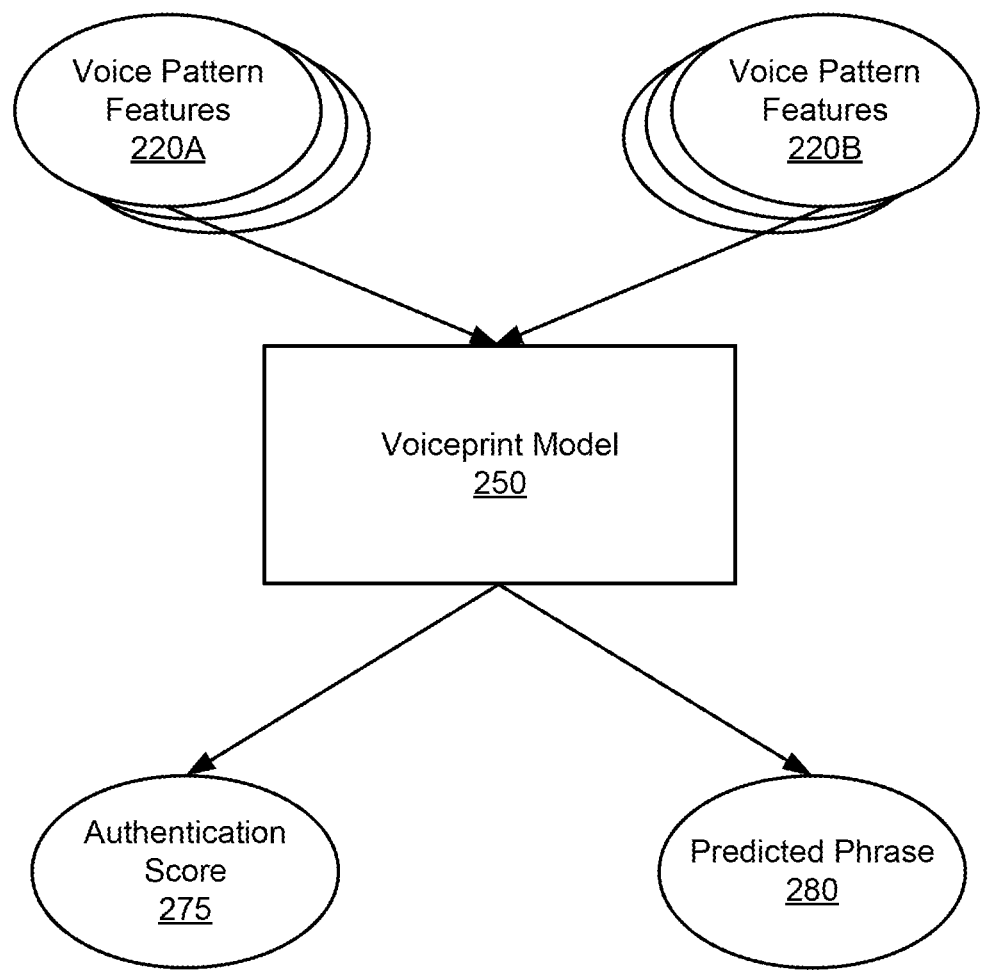
FIG. 2A depicts a block diagram flow process for determining the authenticity of a user who provided an audio recording by applying a voiceprint model, in accordance with an embodiment.

FIG. 2A depicts a block diagram flow process for determining the authenticity of a user that provided an audio recording by applying a voiceprint model 250, in accordance with an embodiment. Generally, FIG. 2A depicts the process performed by the voiceprint model application module 165 during deployment to determine whether to authenticate a user.

The voiceprint application module 165 retrieves a voiceprint model 250 that was previously generated for the user of the client device 110 that provides an audio recording. The voiceprint application module 165 can identify the appropriate voiceprint model 250 by comparing an identifier (e.g., a user identifier or a device identifier) that is included with the audio recording to an identifier associated with the stored voiceprint model 250. The voiceprint application module 165 retrieves the appropriate voiceprint model 250 that has an associated identifier that matches the identifier received with the audio recording.

The voiceprint model 250 receives voice pattern features 220A and 220B that are extracted from an audio recording obtained by a client device 110. As stated above, the first set of voice pattern features 220A include voice pattern features that can distinguish the voice of the user in the audio recording from the voice of other users. The second set of voice pattern features 220B include voice pattern features that can be used to identify the particular phrase that is vocalized in the audio recording.

The voiceprint application module 165 provides the first set of voice pattern features 220A and the second set of voice pattern features 220B as input to the voiceprint model 250. Here, the voiceprint model 250 has been previously trained for the user of the client device 110 that generated the audio recording. By analyzing the first set of voice pattern features 220A and the second set of voice pattern features 220B, the voiceprint model 250 outputs an authentication score 275 and a predicted phrase 280. The authentication score 275 represents a measure of similarity between the voice of the user in the audio recording and the voice in prior audio recordings that were used to train the voiceprint model. The predicted phrase 280 represents a prediction of the vocalized phrase in the audio recording.

Structure of a Voiceprint Model

A voiceprint model is specific for a user. In various embodiments, a voiceprint model can be one of a decision tree, an ensemble (e.g., bagging, boosting, random forest), linear regression, Naïve Bayes, neural network, or logistic regression. The voiceprint model includes learned parameters that, during training, are adjusted such that the voiceprint model can better identify a voice of a user or a vocalized phrase in an audio recording.

In various embodiments, the voiceprint model may be composed of a first portion and a second portion. The first portion of the voiceprint model may output the authentication score 275 which reflects whether the voice in the audio recording aligns with the user that the voiceprint model is specific for. Additionally, the second portion of the voiceprint model may output the predicted phrase 280 that is vocalized in the audio recording.

In one embodiment, the first portion of the voiceprint model and the second portion of the voiceprint model are individual models themselves. Therefore, the first portion of the voiceprint model can be configured to receive the first set of voice pattern features 220A of an audio recording and determines the authentication score 275 based on the first set of voice pattern features 220A. The second portion of the voiceprint model can be configured to receive the second set of voice pattern features 220B of an audio recording and determines the predicted phrase 280 based on the second set of voice pattern features 220B.

In one embodiment, the first portion and the second portion of the voiceprint model may have overlapping subportions. Therefore, each of the first portion and the second portion can take into consideration voice pattern features from both the first set and second set of voice pattern features to determine the authentication score 275 and predicted phrase 280, respectively. As an example, the voiceprint model can be a neural network. The input layer of the voiceprint model can be a common layer of neurons that is shared between the first portion and the second portion of the voiceprint model. The input layer of the voiceprint model can include nodes that each corresponds to a voice feature from either the first set or second set of voice pattern features. The input layer of the voiceprint model can be connected to one or more intermediate layers that are either shared or unshared between the first portion and the second portion of the voiceprint model. For example, unshared intermediate layers include a first intermediate layer is a neuron layer of the first portion and a second intermediate layer is a neuron layer of the second portion. The intermediate layer of the first portion of the voiceprint model can be further connected to one or more additional intermediate layers, or can be connected to an output layer of neurons that outputs the authentication score 275. The intermediate layer of the second portion of the voiceprint model can be further connected to one or more additional intermediate layers or can be connected to an output layer of neurons that outputs the predicted phrase 280.

Training a Voiceprint Model

The voiceprint model training module 170 trains voiceprint models that are each specific for a user. Generally, the voiceprint model training module 170 trains voiceprint models using training examples and subsequently stores the trained voiceprint models for retrieval during deployment.

Figure 2B:
FIG. 2B depicts training examples used to train a voiceprint model for an individual, in accordance with an embodiment.
Figure 2B:
Figure 2B:
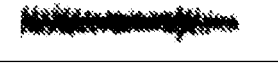

Reference is now made to FIG. 2B, which depicts training examples used to train a voiceprint model for a user, in accordance with an embodiment. Each training example can include a training audio recording 205, a random phrase 210, and an output label 215. For each training example, the training audio recording 205 can be an audio recording of the random phrase 210 in the training example or of a different phrase. In one embodiment, if the training audio recording 205 is an audio recording of the random phrase 210 in the training example, the label 215 indicates that the random phrase 210 is the phrase in the training audio recording 205. For example, the label 215 can be assigned a value of "1." In various embodiments, if the training audio recording 205 is an audio recording of a different phrase that is not the random phrase 210 in the training example, the label 215 can be an indication of the different phrase. In one embodiment, the label 215 can be assigned a value of "0," thereby indicating that the random phrase 210 is not vocalized in the training audio recording 205 of the training example.

In various embodiments, training audio recordings 205 can be obtained from a client device 110. In one embodiment, training audio recordings 205 are obtained when the user of the client device 110 first registers with the service provider system 135. For example, when the user of the client device 110 sets up login credentials (e.g., user name and password), the user of the client device 110 may be presented a random phrase 210 and prompted to vocalize the random phrase. Thus, the training audio recordings 205 can be included as a part of a training example.

The training examples obtained from a user of a client device 110 are used to train a voiceprint model for a user. As stated above, the feature extraction module 160 extracts voice pattern features from a training audio recording 205 of a training example. The voice pattern features can include a first set of voice pattern features that define the voice of the user of the client device 110 and a second set of voice pattern features 220B that define the random phrase 210 that is vocalized in the training audio recording 205 of the training example.

The voiceprint model training module 170 trains a voiceprint model over multiple iterations by using the voice pattern features extracted from the training audio recording 205 of each training example. Specifically, at each iteration, the voiceprint model training module 170 provides the voice pattern features of the training audio recording 205 as input to the voiceprint model. Given that each training audio recording 205 is obtained from the user of the client device 110, the voiceprint model training module 170 adjusts the learned parameters of the voiceprint model that are associated with particular voice pattern features of the audio recording such that the voiceprint model can accurately identify voice pattern features as belonging to the user. In various embodiments, the voiceprint model training module 170 only adjusts the learned parameters of the first portion of the voiceprint model such that the first portion of the voiceprint model can output a more accurate authentication score that is reflective of whether the voice in an audio recording belongs to a particular user.

Additionally, at each iteration, the voiceprint model training module 170 adjusts learned parameters of the voiceprint model such that the voiceprint model more accurately predicts a phrase vocalized in the training audio recording 205. For example, the voiceprint model training module 170 receives a predicted phrase as output from the voiceprint model. Given the label 215 that indicates the actual vocalized phrase in the training audio recording 205, the voiceprint model training module 170 adjusts the learned parameters of the voiceprint model to more accurately predict a predicted phrase of the training audio recording 205. In one embodiment, the voiceprint model training module 170 determines a difference between the predict phrase and the label and backpropagates the determined different to adjust the learned parameters of the voiceprint model. Therefore, the voiceprint model is trained to minimize the backpropagated difference. In various embodiments, the voiceprint model training module 170 only adjusts the second portion of the voiceprint model such that the second portion of the voiceprint model can output a more accurate predicted phrase that is reflective of the phrase that was vocalized in an audio recording.

Process Diagram for Authenticating a Communication Session

Figure 3A:
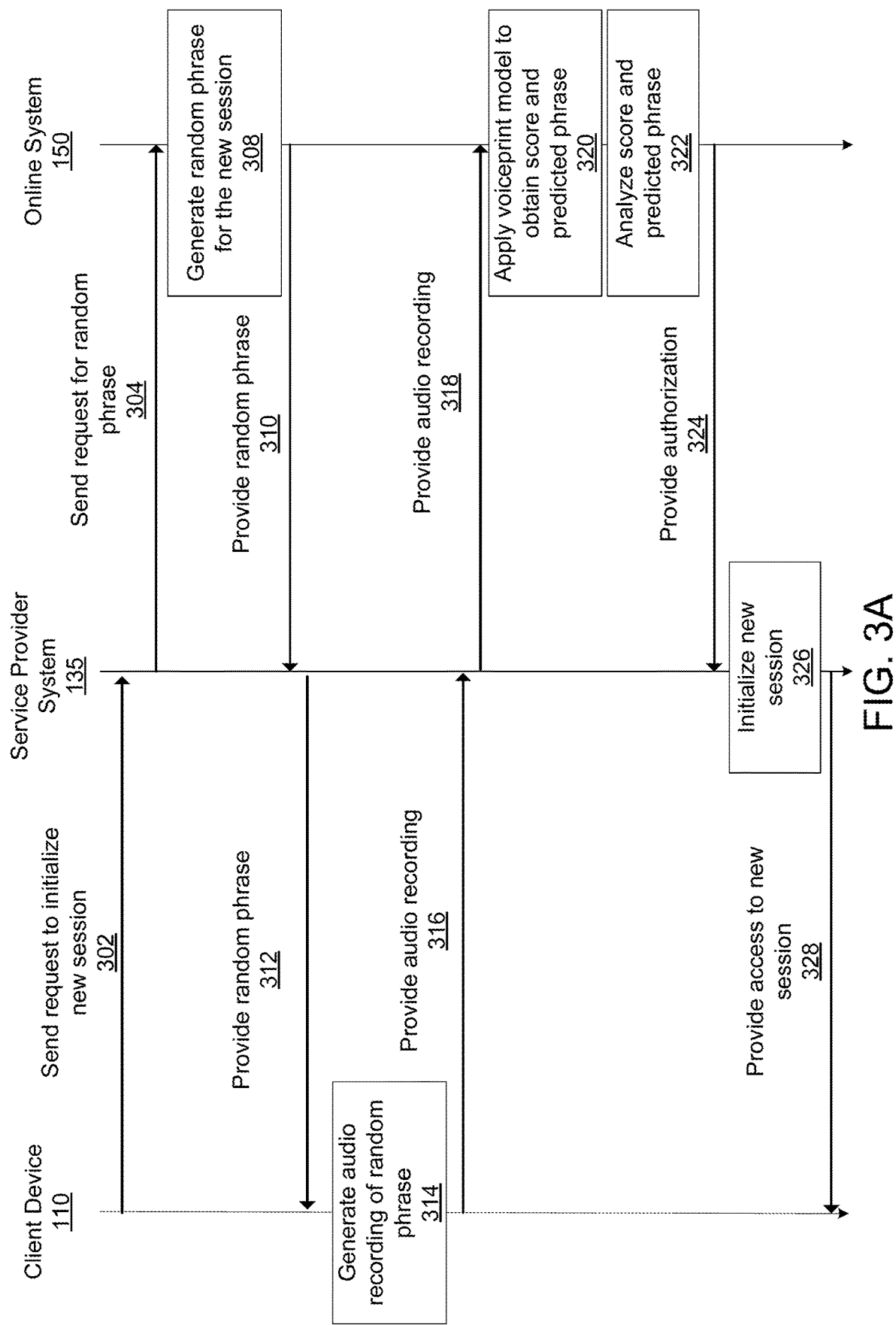
FIG. 3A depicts an interaction diagram between a client device, service provider system, and online system for authenticating a communication session through a voiceprint, in accordance with an embodiment.

FIG. 3A depicts an interaction diagram between a client device 110, service provider system 135, and online system 150 for authenticating a communication session through a voiceprint, in accordance with an embodiment. The client device 110 sends 302 a request to initialize a new communication session to the service provider system 135. The service provider system 135 can send 304 a request to the online system 150 for a random phrase to be used to authenticate the user of the client device 110. The online system 150 generates 308 a random phrase for the new communication session. In various embodiments, the online system 150 can perform a check to ensure that the random phrase was not previously provided to the user of the client device 110.

The online system 150 provides 310 the random phrase to the service provider system 135, which further provides 312 the random phrase to the client device 110. The client device 110 generates 314 an audio recording of the random phrase and provides 316 the audio recording to the service provider system 135. The service provider system 135 further provides 318 the audio recording to the online system 150 to perform the authentication process. The online system 150 applies 320 a voiceprint model that is specific for the user of the client device 110. The voiceprint model outputs a score that represents a similarity between the audio recording captured by the client device 110 and prior audio recordings of the user. Additionally, the voiceprint model outputs a predicted phrase representing a prediction of the vocalized phrase in the audio recording. The online system 150 analyzes 322 the score and the predicted phrase to determine whether to authenticate the user of the client device 110.

Upon successfully authenticating the user of the client device 110, the online system 150 provides 324 an authorization to the service provider system 135. In one embodiment, the service provider system 135 can initialize 326 a new communication session given the authorization from the online system 150. The service provider system 135 provides 328 the client device 110 access to the new communication session. The client device 110 can provide communications via the new communication session.

Figure 3B:
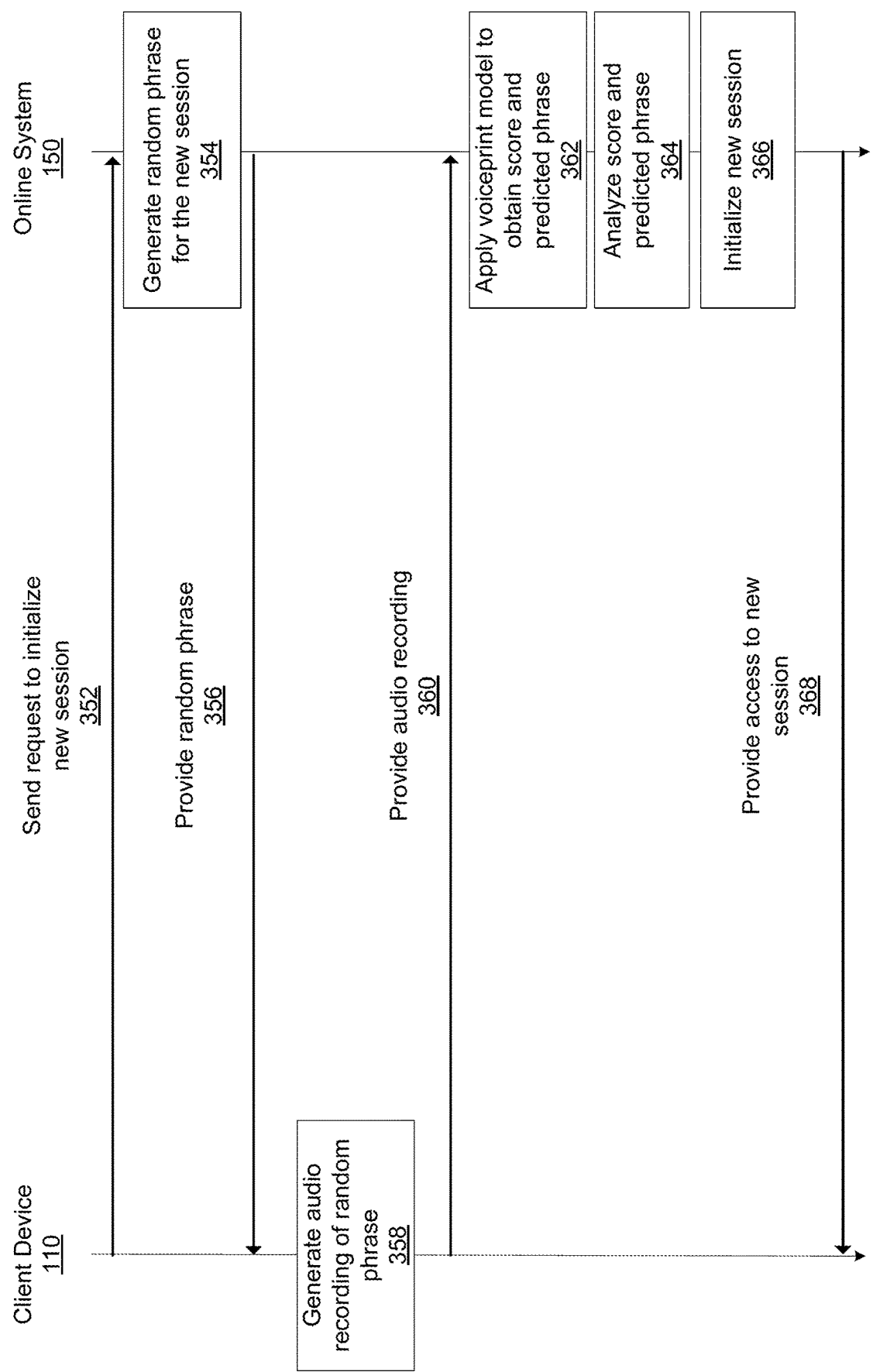
FIG. 3B depicts an interaction diagram between a client device and an online system for authenticating a communication session through a voiceprint, in accordance with an embodiment.

FIG. 3B depicts an interaction diagram between a client device 110 and an online system 150 for authenticating a communication session through a voiceprint, in accordance with an embodiment. FIG. 3B differs from FIG. 3A in that FIG. 3B depicts an embodiment where the online system 150 and the service provider system 135 are embodied as a single system.

Here, the client device 110 sends 352 a request to initialize a new communication session. The online system 150 generates 354 a random phrase for the new communication session that differs from prior random phrases that were provided for the user of the client device 110. The online system 150 provides 356 the random phrase to the client device 110. The client device 110 generates 358 an audio recording of the random phrase and provides 360 the audio recording to the online system 150 for authentication. The online system 150 applies 362 a voiceprint model specific for the user of the client device 110. The voiceprint model outputs a score and a predicted phrase. The online system 150 analyzes 364 the score and the predicted phrase to determine whether to authenticate the user of the client device 110.

Upon successfully authenticating the user of the client device 110, the online system 150 initializes 366 a new communication session and provides 368 the client device 110 access to the new communication session. The client device 110 can provide communications via the new communication session.

Example Computing Device

Figure 4:
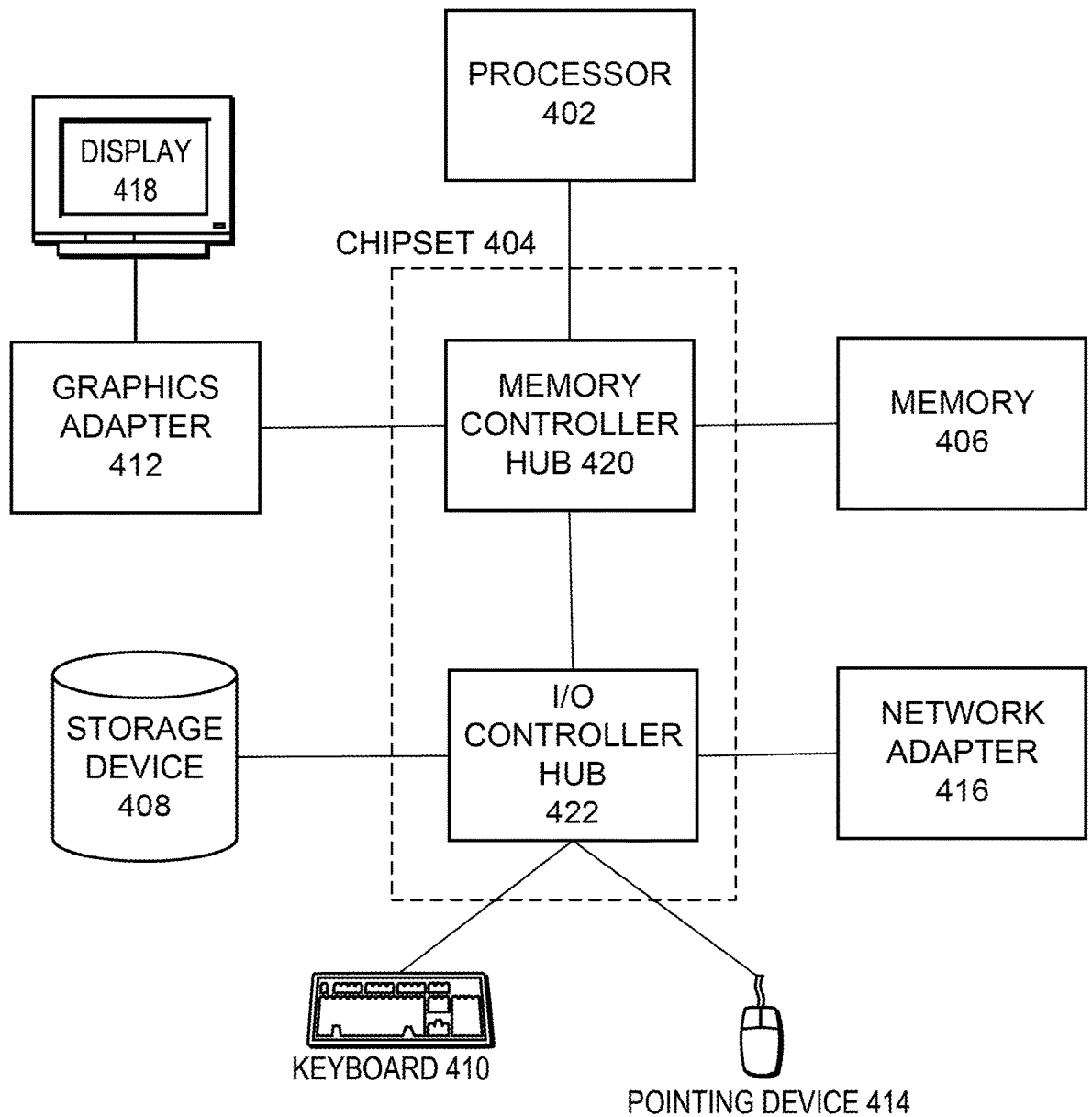
FIG. 4 is a high-level block diagram illustrating physical components of a computer, in accordance with an embodiment.

FIG. 4 is a high-level block diagram illustrating physical components of a computer 400 used as part or all of one or more of the entities described herein in one embodiment. For example, instances of the illustrated computer 400 may be a client device 110 used by a user that requests a communication session and captures an audio recording of a randomly generated phrase. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer 400. The graphics adapter 412 displays images and other information on the display 418. The network adapter 416 couples the computer 400 to a local or wide area network.

In various embodiments, a computer 400 can have different and/or other components than those shown in FIG. 4. For example, the computer 400 may include additional devices such as a microphone that captures audio recordings or a speaker that can playback an audio recording. In other embodiments, the computer 400 can lack certain illustrated components. In one embodiment, a computer 400 acting as a server may lack a keyboard 410, pointing device 414, graphics adapter 412, and/or display 418. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, from a client device, a request for authentication;
generating a random phrase for a user of the client device;
providing, to the client device, the generated random phrase;
receiving an audio recording of a vocalization of the random phrase by the user from the client device;
providing the received audio recording to a neural network, the neural network trained using audio recordings obtained from the user to generate a voiceprint model for the user, the voiceprint model having learned parameters that, during training, are adjusted for the voiceprint model to identify a voice of the user or a vocalized phrase by the user in an audio recording from the user, the voiceprint model comprising a first portion and a second portion;
receiving, from the first portion of the voiceprint model, an authentication score for the received audio recording, the authentication score representing a similarity between a voice in the received audio recording and the voice of the user;
receiving, from the second portion of the voiceprint model, a predicted phrase, the predicted phrase representing a prediction of the vocalized random phrase in the received audio recording; and
authenticating the client device based on the received authentication score and the received predicted phrase determined for the received audio recording.

2. The method of claim 1, wherein generating the random phrase for the user of the client device comprises:
comparing the generated random phrase to one or more phrases previously generated for the user.

3. The method of claim 1, wherein the neural network was trained for the user by:
generating a training phrase for the user;
obtaining a training audio recording of the user, the training audio recording corresponding to the training phrase;
extracting voice pattern features from the training audio recording; and
training the neural network to generate the voiceprint model based on the extracted voice pattern features from the training audio recording.

4. The method of claim 3, wherein the extracted voice pattern features of the training audio recording comprise one or more of: a statistical measure of an amplitude of the training audio recording, a statistical measure of a frequency of the training audio recording, a cadence, a lisp, a categorization of a phoneme, a cepstral coefficient, a perceptual linear predictive coefficient, or a filter-bank feature.

5. The method of claim 1, wherein the request for authentication is a request for a communication session, and wherein the communication session is one of a new phone call, a new online chat, a new voice call, a new video call, or a new text message.

6. The method of claim 1 further comprising:
receiving a first level of authentication information; and
verifying the first level of authentication information,
wherein authenticating the client device is further based on the verification of the first level of authentication information.

7. The method of claim 1, further comprising: extracting voice pattern features from the received audio recording, and wherein providing the received audio recording as the input to the neural network comprises providing the extracted voice pattern features as input to the neural network.

8. A non-transitory computer readable medium comprising instructions that, when executed by a processor, cause the processor to:
receive, from a client device, a request for authentication;
generate a random phrase for a user of the client device;
provide, to the client device, the generated random phrase;
receive an audio recording of a vocalization of the random phrase by the user from the client device;
provide the received audio recording to a neural network, the neural network trained using audio recordings obtained from the user to generate a voiceprint model for the user, the voiceprint model having learned parameters that, during training, are adjusted for the voiceprint model to identify a voice of the user or a vocalized phrase by the user in an audio recording from the user, the voiceprint model comprising a first portion and a second portion;
receive, from the first portion of the voiceprint model, an authentication score for the received audio recording, the authentication score representing a similarity between a voice in the received audio recording and the voice of the user;
receive, from the second portion of the voiceprint model, a predicted phrase, the predicted phrase representing a prediction of the vocalized random phrase in the received audio recording; and
authenticate the client device based on the authentication score and predicted phrase determined for the received audio recording.

9. The non-transitory computer readable medium of claim 8, wherein the instructions that cause the processor to generate the random phrase for the user of the client device further comprises instructions that, when executed by the processor, cause the processor to:
compare the generated random phrase to one or more phrases previously generated for the user.

10. The non-transitory computer readable medium of claim 8, wherein the neural network was trained for the user by:
generating a training phrase for the user;
obtaining a training audio recording of the user, the audio recording corresponding to the training phrase;
extracting voice pattern features from the training audio recording; and
training the neural network to generate the voiceprint model based on the extracted voice pattern features from the training audio recording.

11. The non-transitory computer readable medium of claim 10, wherein the extracted features of the training audio recording comprise one or more of: a statistical measure of an amplitude of the training audio recording, a statistical measure of a frequency of the training audio recording, a cadence, a lisp, a categorization of a phoneme, a cepstral coefficient, a perceptual linear predictive coefficient, or a filter-bank feature.

12. The non-transitory computer readable medium of claim 8, wherein the request for authentication is a request for a communication session, and wherein the communication session is one of a new phone call, a new online chat, a new voice call, video call, or a new text message.

13. The non-transitory computer readable medium of claim 8, further comprising instructions that, when executed by the processor, cause the processor to:

receive a first level of authentication information; and verify the first level of authentication information, wherein authenticating the client device is further based on the verification of the first level of authentication information.

14. The non-transitory computer readable medium of claim 8, further comprising instructions that, when executed by the processor, cause the processor to: extract voice pattern features from the received audio recording, and wherein providing the received audio recording as the input to the neural network comprises providing the extracted voice pattern features of the received audio recording as input to the neural network.

15. A system comprising:
a processor; and
a non-transitory computer-readable medium containing instructions that, when executed by the processor, cause the processor to:
receive, from a client device, a request for authentication;
generate a random phrase for a user of the client device;
provide, to the client device, the generated random phrase;
receive an audio recording of a vocalization of the random phrase by the user from the client device;
provide the received audio recording to a neural network, the neural network trained using audio recordings obtained from the user to generate a voiceprint model for the user, the voiceprint model having learned parameters that, during training, are adjusted for the voiceprint model to identify a voice of the user or a vocalized phrase by the user in an audio recording from the user, the voiceprint model comprising a first portion and a second portion;
receive, from the first portion of the voiceprint model, an authentication score for the received audio recording, the authentication score representing a similarity between a voice in the received audio recording and the voice of the user;
receive, from the second portion of the voiceprint model, a predicted phrase, the predicted phrase representing a prediction of the vocalized random phrase in the received audio recording; and
authenticate the client device based on the authentication score and predicted phrase determined for the received audio recording.

16. The system of claim 15, wherein the instructions that cause the processor to generate the random phrase for the user of the client device further comprises instructions that, when executed by the processor, cause the processor to:
compare the generated random phrase to one or more phrases previously generated for the user.

17. The system of claim 15, wherein the neural network was trained for the user by:
generating a training phrase for the user;
obtaining a training audio recording of the user, the audio recording corresponding to the training phrase;
extracting voice pattern features from the training audio recording; and
training the neural network to generate the voiceprint model based on the extracted voice pattern features from the training audio recording.

18. The system of claim 17, wherein the extracted features of the training audio recording comprise one or more of a statistical measure of an amplitude of the training audio recording, a statistical measure of a frequency of the training audio recording, a cadence, a lisp, a categorization of a phoneme, a cepstral coefficient, a perceptual linear predictive coefficient, and a filter-bank feature.

19. The system of claim 15, wherein the request for authentication is a request for a communication session, and wherein the communication session is one of a new phone call, a new online chat, a new voice call, video call, or a new text message.

20. The system of claim 15, wherein the instructions further comprise instructions that, when executed by the processor, cause the processor to:
receive a first level of authentication information; and
verify the first level of authentication information, wherein authenticating the client device is further based on the verification of the first level of authentication information.

* * * * *